United States Patent [19]
Minoura

[11] 3,970,780
[45] July 20, 1976

[54] CONSTANT-VOLTAGE POWER SUPPLY

[75] Inventor: Nobuo Minoura, Ootawara, Japan

[73] Assignee: Sharp Kabushiki Kaisha, Osaka, Japan

[22] Filed: Sept. 28, 1973

[21] Appl. No.: 401,847

[30] Foreign Application Priority Data
Oct. 4, 1972   Japan.............................. 47-99613
May 17, 1973   Japan.............................. 48-55097

[52] U.S. Cl.................... 178/7.3 R; 178/DIG. 11; 315/411
[51] Int. Cl.²..................................... H04N 3/18
[58] Field of Search....... 178/7.3 R, 7.5 R, DIG. 11; 315/27 TD, 411; 323/22 SC, DIG. 1

[56] References Cited
UNITED STATES PATENTS
| | | | |
|---|---|---|---|
| 3,740,474 | 6/1973 | Dietz.............................. | 178/7.5 R |
| 3,783,367 | 1/1974 | Yamamoto et al............. | 323/22 SC |
| 3,832,595 | 8/1974 | Dietz.............................. | 178/7.5 R |

*Primary Examiner*—Robert L. Griffin
*Assistant Examiner*—George G. Stellar
*Attorney, Agent, or Firm*—Stewart and Kolasch, Ltd.

[57] ABSTRACT

In a power supply circuit useful for a horizontal deflection circuit in a television receiver, there is provided a voltage-controlled semiconductor element, for example, such as silicon controlled rectifier, in order to stabilize effectively the output power voltage. The silicon controlled rectifier is switched between its OFF and ON states in response to two kinds of pulses: flyback pulses occurring within the television receiver and newly produced control pulses having relative phases with respect to the phase of the flyback pulses which relative phases differ depending upon variations in the input power voltage. Current flow through the silicon controlled rectifier charges a capacitor connected thereto which in turn provides the stabilized output voltage to the horizontal deflection circuit.

6 Claims, 5 Drawing Figures

CONSTANT-VOLTAGE POWER SUPPLY

BACKGROUND OF THE INVENTION

This invention pertains generally to a constant-voltage power supply circuit, and more particularly to a constant voltage power supply circuit suitable for a horizontal deflection circuit in a television receiver.

In prior art television receivers, a DC voltage obtained by rectifying and smoothing an AC input power voltage is directly supplied to the horizontal deflection circuit. In this case the voltage supplied to the horizontal deflection circuit will vary upon variations in the input power voltage or current through a high-voltage load and result in variations in deflection current, hence width of a television screen. Further, more power is required in the horizontal deflection circuit.

OBJECTS AND SUMMARY OF THE INVENTION

A primary object of this invention is the provision of a constant-voltage power supply circuit which avoids one or more of the disadvantages and limitations of the above-mentioned prior art circuit.

Another object of this invention is the provision of a constant-voltage power supply circuit capable of providing stabilized output voltage.

Yet another object of this invention is the provision of a constant-voltage power supply circuit useful with a horizontal deflection circuit in a television receiver.

Still another object of this invention is the provision of a constant-voltage power supply circuit which functions to maintain a deflection current at a predetermined value in order to ensure a stability in width of a television screen.

A further object of this invention is the provision of a high-efficiency constant-voltage power supply circuit.

DETAILED DESCRIPTION OF THE PREFERRED EMBODIMENTS

Figure 1:
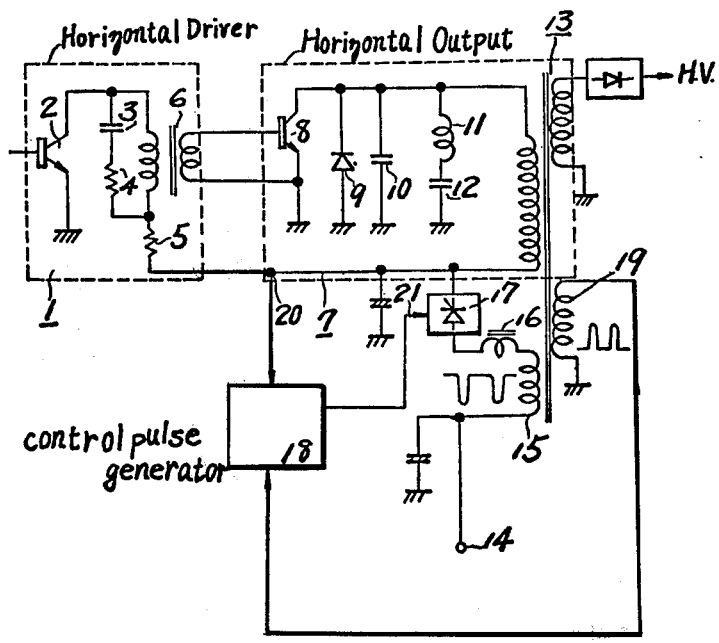
FIG. 1 is a circuit diagram showing a basic construction of a constant-voltage power supply circuit used with a horizontal deflection circuit in a television receiver in accordance with this invention.

Referring now to FIG. 1, a horizontal driver circuit 1 is comprised of a horizontal driver transistor 2, a capacitor 3, resistors 4, 5 and a driver transformer 6, while a horizontal output circuit 7 in the following stage is comprised of a horizontal output transistor 8, a damper diode 9, a resonance capacitor 10, a horizontal deflection coil 11, a compensation capacitor 12 and a horizontal output transformer 13.

In the illustrated example, the above-mentioned horizontal driver circuit 1 and horizontal output circuit 7 are both energized by a DC voltage which is derived from a power input terminal 14 and then stabilized in voltage level through a circuit including a tertiary winding 15 of the horizontal output transformer 13, a choke coil 16 and a voltage-controlled semiconductor element 17.

In a control pulse generator or variation detection and phase control circuit 18, horizontal pulses or flyback pulses induced on a quaternary winding 19 of the output transformer 13 are controlled in phase depending upon a DC output voltage appearing at a power output terminal 20, and the resulting control pulses are then applied to a control electrode 21 of the voltage-controlled semiconductor element 17. In the semiconductor element current flow therethrough is controlled by the horizontal pulses induced on the tertiary winding 15 and the control pulses produced in the variation detection and phase control circuit 18.

As a consequence, in supplying the pre-controlled DC input voltage from the power input terminal 14 via the voltage-controlled semiconductor element 17 to both the horizontal driver circuit 1 and the horizontal output circuit 7, the conduction period of the semiconductor element 17 is controlled in accordance with the value of the DC output voltage appearing at the DC output terminal 20, and the DC output voltage in turn is held constant at all times.

Figure 2:
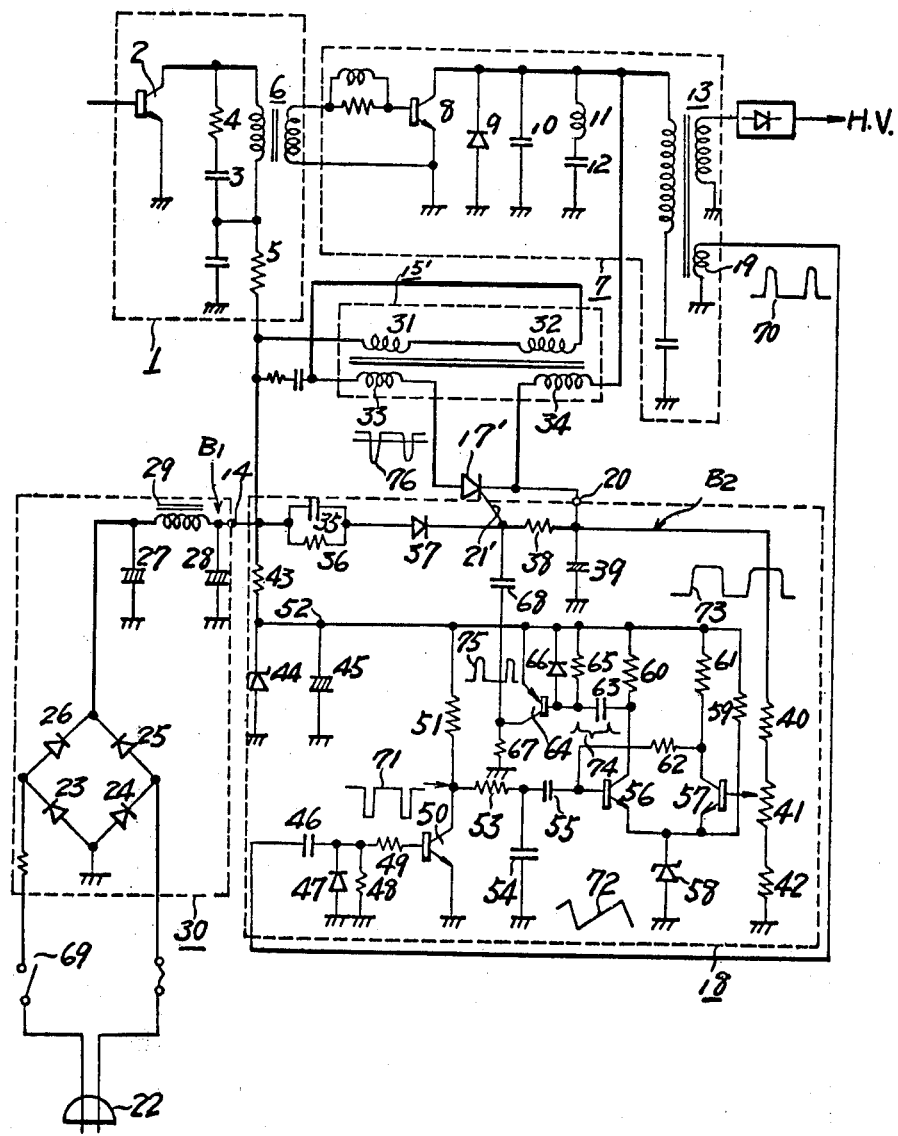
FIG. 2 is a full circuit diagram showing a first embodiment of the horizontal deflection circuit in accordance with this invention.

With reference to FIG. 2, there is illustrated a first embodiment for implementing a concept of operation of the basic circuit arrangement illustrated in FIG. 1.

In this drawing, the pre-controlled DC input voltage $B_1$ is fed via a rectifying and smoothing circuit 30 made up of four diodes 23, 24, 25, 26, two capacitors 27, 28 and a choke coil 29 from an AC power source 22 to the power input terminal 14, and then is applied to an anode of a silicon controlled rectifier 17', the equivalence of the semiconductor element 17 shown in FIG. 1, through windings 31, 32, 33 of a pulse transformer 15'. In addition, this voltage is fed to the error detection and phase control circuit 18. The stabilized DC voltage is supplied from the silicon controlled rectifier 17' to the horizontal output circuit 7 through a winding 34 of the pulse transformer 15'.

In the error detection and phase control circuit arrangement 18, the power input terminal 14 is connected via a parallel circuit of a capacitor 35 and a resistor 36 and a diode 37 to the gate 21' of the silicon controlled rectifier 17' the gate to cathode path of which is shunted by a resistor 38. The cathode of the rectifier 17', which is connected to the power output terminal 20, is grounded by a capacitor 39 and a series circuit of resistors 40, 42 and a variable resistor 41, respectively. The power input terminal 14 also is connected to the ground through a resistor 43 and a parallel circuit of a constant-voltage diode 44 and a capacitor 45, respectively.

One end of the winding 19 of the horizontal output transformer 13, called also a flyback transformer, is directly grounded, while the other end thereof is grounded via a capacitor 46, a diode 47 and a resistor 48, as well as being connected with the base of a transistor 50 via a resistor 49. This transistor 50 has further electrodes, the emitter being grounded and the collector connected via a resistor 51 to a junction point 52 of the resistor 43 and the constant-voltage diode 44, and connected via an integrating circuit consisting of a resistor 53 and a capacitor 54 and a capacitor 55 to the base of a transistor 56. The base of a transistor 57 is connected to the slide terminal of the variable resistor 41.

The emitters of the pair of transistors 56, 57 are connected together to the ground through a constant-voltage diode 58 and to the junction point 52 through a resistor 59, and the collectors thereof are connected to the junction point 52 through resistors 60 and 61, respectively. A resistor 62 connects the base of the transistor 56 to the collector of the transistor 57.

Between the collector of the transistor 56 and the base of a transistor 64 there is a capacitor 63 and transistor 64 includes a base connected via a resistor 65 and a diode 66 to the junction point 52, the emitter being directly connected to the same common connection, 52 and the collector grounded via a resistor 67. Another path for current flow from the collector of the transistor 64 is established by connection with the control electrode 21' of the silicon controlled rectifier 17' through a capacitor 68.

The voltage stabilizing function in the embodiment of FIG. 1 will be better understood after a reading of the folb wing description.

When a power switch 69 is closed to supply the rectifying and smoothing circuit 30 with an AC voltage, the rectified and smoothed DC voltage which is desired to be controlled in voltage level is produced at the power input terminal 14 and then applied to the horizontal driver circuit 1 directly and to the horizontal output circuit 7 via the windings 31, 32, 33, 34 of the pulse transformer 15', as well as the silicon controlled rectifier 17'.

Immediately after closing the power switch 69, the voltage $B_1$ at the power input terminal 14 sharply increases due to transient phenomenon. At this time, the capacitor 35 is charged by current flow through the diode 37, the control electrode 21' of the silicon controlled rectifier 17' and the capacitor 39 as the voltage $B_1$ increases. The charging current through the capacitor 35 causes the silicon controlled rectifier 17' to turn ON.

If the controlled rectifier 17' is turned ON in this manner, current flow circulating through the power input terminal 14 and the windings of the pulse transformer 15' will function to charge the capacitor 39. Such charging current I may be represented by the following formula, assuming no circuit losses $$I = \frac{B_1 - B_2}{L_1 + L_2 + L_3} t \qquad (1)$$

wherein $B_1$ represents voltage at the power input terminal 14, $B_2$ voltage at the power output terminal 20, $L_1$, $L_2$, $L_3$ individual inductances of the windings 31, 32, 33 of the pulse transformer 15', and $t$ charging time respectively.

Afterward, the horizontal output circuit 7 becomes operative when the voltage charged on the capacitor 39 reaches a predetermined level after the change in the controlled rectifier 17' to its ON state. In operation within the horizontal output circuit 7, the flyback pulses occur within the horizontal flyback or retrace line periods, and accordingly, negative-polarity pulses are induced on the winding 33 of the pulse transformer 15'. Upon the appearance of the negative pulses, anode current of the controlled rectifier 17' decreases by degrees, and the rectifier 17' itself is turned OFF in the absence of anode current.

The capacitor 35 serves to trigger the silicon controlled rectifier 17' only just after power throw, and thus becomes non-operative when the horizontal output circuit 7 initiates its performance. The provision of the resistor 36 connected in parallel to the capacitor 35 is for establishing a discharge path for the capacitor 35.

Figure 3:
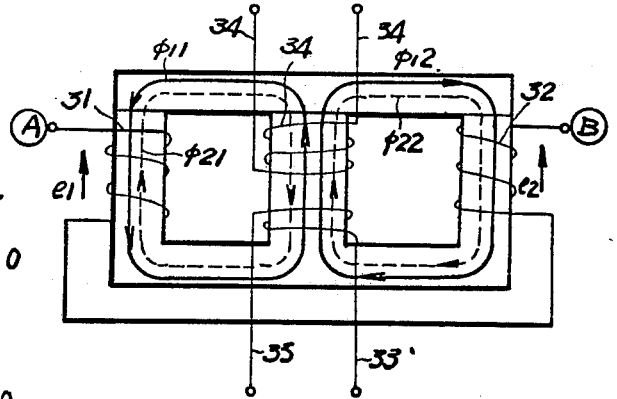
FIG. 3 is a schematic diagram showing a pulse transformer used in the embodiment shown in FIG. 2.

FIG. 3 illustrates a composite type of transformer employed as the pulse transformer 15', wherein the winding 33 is electromagnetically coupled with the winding 34 but not with the windings 31, 32. More specifically, the windings 33, 34 are wound on a middle leg of the core of EI shape and the windings 31, 32 on both side legs respectively. Though the windings 33, 34 are merely transformer coils, the windings 31, 32 are wound as choke coils. To this end, the windings 31, 32 are formed in opposite winding directions in order that they are not influenced by the other windings 33, 34.

With such arrangement, voltages $e_1$, $e_2$ are induced on the windings 31, 32 by means of magnetic fluxes $\phi 11$, $\phi 12$ derived from the windings 33, 34. Since the windings have the identical number of turns, the individual voltages $e_1$, $e_2$ cancel each other, so that an induced voltage does not develop between the both points Ⓐ , Ⓑ

The fluxes $\phi 21$, $\phi 22$ produced by the windings 31, 32 circulate in opposite directions through the middle leg to cancel each other, so that the windings 33, 34 are not under the influence of the fluxes $\phi 21$, $\phi 22$. The fluxes in the side legs are, however, added together, and thus the windings 31, 32 serve as inductors. In the normal operation of the horizontal output circuit 7, the winding 19 of the horizontal output or flyback transformer 13 provides flyback pulses 70 of positive polarity as illustrated in FIG. 4(a). The flyback pulses are supplied via the capacitor 46 and the resistor 49 to the base of the transistor 50, which in turn amplifies these flyback pulses and delivers from the collector thereof the completely rectangular pulses 71 as illustrated in FIG. 4(b). Because the power voltage energizing the transistor 50 is stabilized by functions of the constant-voltage diode 44, the output pulses 71 of the transistor 50 are held at a fixed amplitude at all times irrespective of variations in input pulse voltage or AC input power voltage. The diode 47 is provided to protect the transistor 50 against overvoltage.

The rectangular pulses 71 developing at the collector of the transistor 50 are then integrated by a combination of the resistor 53 and capacitor 54, and the resultant saw-tooth voltage 72 as illustrated in FIG. 4(c) is impressed on the base of the transistor 56 via the capacitor 55.

A series of the resistors 40, 41, 42 functions to divide the output voltage B2 from the cathode of the silicon controlled rectifier 17' and the power output terminal 20, such divided partial voltage being applied to the base of the transistor 57. The constant-voltage diode 58 always supplies a given reference voltage to the emitter of the transistor 57, the input base voltage of which therefore is compared with the reference voltage and then amplified.

Then, the DC voltage including variations amplified by the transistor 57 is applied to the base of the transistor 56 through the resistor 62 and accordingly superposed as bias voltage on the saw-tooth voltage or the input voltage to the base of the transistor 56. The DC voltage which is supplied via the resistor 62 from the collector of the transistor 57 to the base of the transistor 56 falls as the output voltage $B_2$ rises. The input base voltage at this time is of sinuous fashion illustrated by the dotted line of FIG. 4(d). Conversely, if the output voltage $B_2$ falls, then the input base voltage increases as illustrated by the solid lines in FIG. 4(d). The transistor 56 is turned ON when the base voltage thereof reaches a predetermined value and held OFF when the base voltage is below the same. The rectangular voltage 73 as illustrated in FIG. 4(e), therefore, appears at the collector of the transistor 56. It will be noted that the pulse width of the rectangular voltage varies depending on the value of the output voltage $B_2$. In other words, the more the output voltage $B_2$ increases, the more the pulse width enlarges.

The capacitor 63 and the resistor 65 cooperate with each other to differentiate the rectangular waveform voltage from the collector of the transistor 56 and provide the differentiated voltage 74 as illustrated in FIG. 4(f) to the base of the transistor 64. The transistor 64 has the function of amplifying only the negative-polarity pulse within the differentiation waveform and results in the pulse voltage 75 as illustrated in FIG. 4(g) as the collector output thereof.

The collector pulses 75 from the transistor 64 cause the gate current as illustrated in FIG. 4(h) to flow through the gate of the silicon controlled rectifier 17' from the capacitor 68, thereby turning the rectifier 17' ON. Upon the change of the rectifier 17' to its ON state, the anode current therethrough increases linearly as illustrated in FIG. 4(i).

Figure 4:
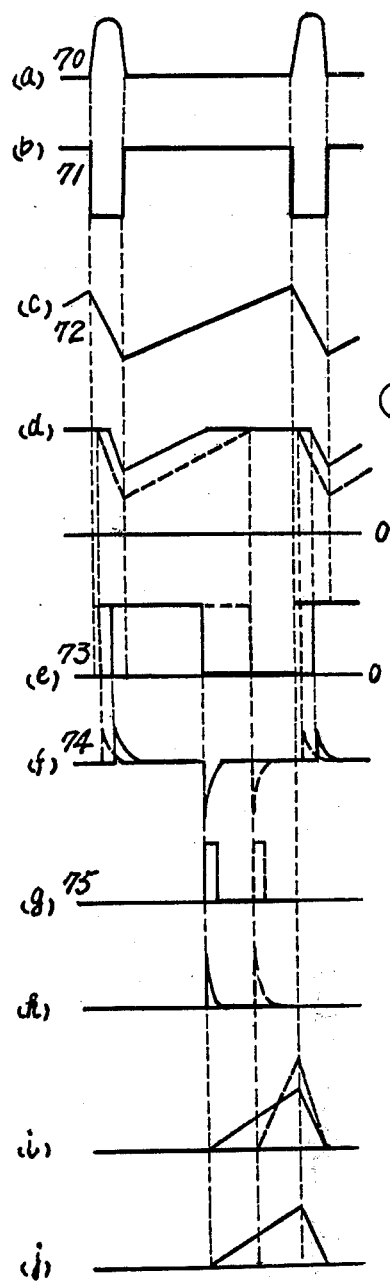
FIG. 4 is a time chart showing various signals which occur in the circuit shown in FIG. 2.

It will be understood from teachings of FIG. 4 that the point in time where the silicon controlled rectifier 17' is turned ON is delayed with increment of the output voltage $B_2$, and conversely the turn ON point is advanced with decrement of the same. In this way, the conduction period of time of the rectifier 17' is controlled so as to make the DC output voltage $B_2$ constant. The silicon controlled rectifier 17' is turned OFF in response to the horizontal flyback pulses 76 of negative polarity which are regularly induced on the winding 33 of the pulse transformer 15' during the flyback line period.

In the embodiment as previously discussed, when the pre-controlled DC input voltage $B_1$ is supplied to the horizontal output circuit 7 via the pulse transformer 15' and the silicon controlled rectifier 17', the variation detection/phase control circuit 18 senses the current value of the DC output voltage $B_2$ and then forms turn ON pulses the phases of which are determined in accordance with such detected value of the DC output voltage $B_2$. Upon the appearance of these pulses, the controlled rectifier element 17' is relatively turned ON on the basis of variation detection functions, whereas the controlled rectifier 17' is fixedly turned OFF in response to the flyback pulses from the pulse transformer 15'. In such manner, the conduction period of the controlled rectifier 17' is dominated by the amplitude of the output voltage $B_2$, and as a result the resultant output voltage is maintained constant within the period of time.

Therefore, the constant-voltage power supply circuit of this invention employed in conjunction with the horizontal deflection arrangement is designed to feed the pre-controlled input voltage $B_1$ to the deflection arrangement during only a portion of the latter half cycle within the horizontal scanning period, rather than feeding the same during the whole scanning period. This provides an improvement in power efficiency.

In addition, in accordance with the power supply circuit of this invention, the pulse transformer 15' enables the horizontal flyback pulses to be superposed or added onto the pre-controlled DC input voltage $B_1$, thereby providing a DC output voltage $B_2$ of amplitude higher than that of the input voltage $B_1$.

As noted earlier, in the first embodiment illustrated in FIG. 2, the silicon controlled rectifier 17' responds to the negative flyback pulses 76 induced on the winding 33 of the pulse transformer 15' for changing to the OFF condition. There is a problem associated with the illustrated arrangement, however, which results in turn-OFF delay in the silicon controlled rectifier 17' for the reasons that the windings 31, 32 serving as choke coils are connected in series with the winding 33 in the pulse transformer 15', such that the windings 31, 32 produces the opposite polarity pulses as compared with the pulses induced on the winding 33.

Figure 5:
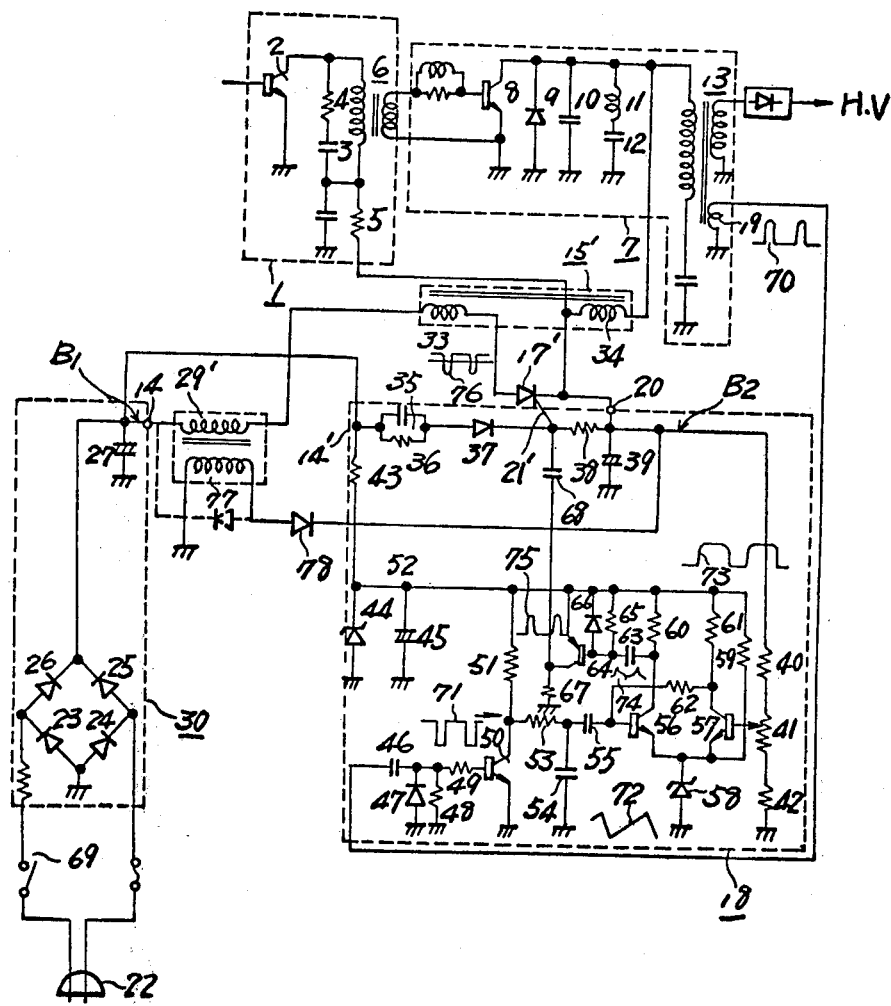
FIG. 5 is a full circuit diagram showing a second embodiment of the horizontal deflection circuit.

FIG. 5 illustrates another embodiment taking account of the foregoing, wherein a secondary winding 77 electromagnetically coupled with a choke coil 29' is provided, one end of which is grounded and the other end of which is connected to the cathode of the silicon controlled rectifier 17' via a damper diode 78. Generally speaking, the damper circuit is connected in parallel to the choke coil 29. With such circuit arrangement, the pulses induced by the choke coil 29' are suppressed or damped so that the silicon controlled rectifier 17' is quickly turned OFF in response to the flyback pulses. Hence, the turn-OFF time may be shortened as illustrated in FIG. 4(j). In the embodiment illustrated in FIG. 5, the choke coil 29' is the equivalence of a combination of the choke coil 29 and windings 31, 32 of the pulse transformer 15' in FIG. 2.

Although the damper circuit comprised of the secondary winding 77 and the damper diode 78 is connected to the cathode of the silicon controlled rectifier 17' in the illustrated example, such damper circuit may be connected to the power input terminal 14, alternatively.

I claim:
1. A constant-voltage power supply circuit for use in the horizontal deflection circuit of a television receiver comprising;

a source of non-stabilized DC input voltage;

voltage-controlled semiconductor gating means having an input and an output;

means for supplying said non-stabilized DC input voltage to the input of said semiconductor means;

means for generating a DC output voltage at the output of said semiconductor gating means, the amplitude of said DC output voltage being a function of the conduction period of said semiconductor gating means;

means for extracting flyback pulses of a substantially constant frequency from the horizontal deflection circuit of said television receiver;

control means for detecting amplitude variations in said DC output voltage and producing control pulses, said control pulses being delayed in phase from said flyback pulses as a function of the amplitude of said DC output voltage;

means for applying said flyback pulses to both said voltage-controlled semiconductor gating means and said control means, said flyback pulses applied to said semiconductor gating means biasing said semiconductor gating means out of conduction, said flyback pulses applied to said control means providing a pulse train from which said control pulses are generated in conjunction with the amplitude of said DC output voltage;

means for applying said control pulses to said voltage-controlled semiconductor gating means to bias said semiconductor means into conduction;

whereby the conduction period of said semiconductor gating means is a function of said delay in phase of said control pulses from said flyback pulses thereby regulating and stabilizing the DC output voltage.

2. A constant-voltage power supply circuit as set forth in claim 1 wherein said means for generating a DC output voltage comprises capacitor means coupled to said output of said semiconductor gating means, said capacitor charging during the conduction period of said semiconductor gating means.

3. A constant-voltage power supply circuit in accordance with claim 1, wherein said voltage-controlled semiconductor means is a silicon controlled rectifier and such control pulses are applied to the control gate of said silicon controlled rectifier.

4. A constant-voltage power supply circuit as set forth in claim 1 wherein means are provided for applying said flyback pulses to said input of said semiconductor gating means to bias said semiconductor means out of conduction.

5. A constant-voltage power supply circuit as set forth in claim 4 wherein said means for applying said flyback pulses to the input of said semiconductor gating means comprises a pulse transformer connected between said DC input voltage supplying means and said voltage controlled semiconductor gating means, said pulse transformer having a first winding serving as a choke coil and a second winding in which said flyback pulses are electromagnetically induced for application to the input of said semiconductor gating means.

6. A constant-voltage power supply circuit as set forth in claim 5 comprising means for damping a voltage induced in said second winding in response to turning said semiconductor means OFF, thereby decreasing turn-OFF response time of said semiconductor means.

* * * * *